Dec. 2, 1958  W. I. TEBO  2,862,588
VARIABLE SPEED DEVICE
Filed Feb. 8, 1956  2 Sheets-Sheet 1

INVENTOR.
William I. Tebo,
BY Paul & Paul
ATTORNEYS.

Dec. 2, 1958 W. I. TEBO 2,862,588
VARIABLE SPEED DEVICE
Filed Feb. 8, 1956 2 Sheets-Sheet 2

INVENTOR.
William I. Tebo,
BY Paul & Paul
ATTORNEYS.

United States Patent Office 2,862,588
Patented Dec. 2, 1958

2,862,588

VARIABLE SPEED DEVICE

William I. Tebo, Birmingham, Mich., assignor to Detrex Corporation, Detroit, Mich., a corporation of Michigan Application February 8, 1956, Serial No. 564,295

3 Claims. (Cl. 192—4)

This invention relates to a variable speed device, and more particularly to improvements in apparatus to drive machines which require two speeds in their normal function. More specifically the present invention concerns an electrical drive unit for machines such as dry cleaning machines and laundry washers that require a slow speed for the wash cycle and a high speed for the extraction cycle.

In conventional dry cleaning machines and laundry washers, it is common to have a separate motor for each cycle of different speed and to provide inter-connecting drive means. This arrangement requires a great deal of space and is difficult to assemble and align properly.

It is accordingly an object of this invention to provide means for obtaining a two speed drive from a common prime mover in a single compact unit, thus eliminating the use of a gear head motor, an extraction motor and the inter-connecting drive means of prior devices. Another object is to provide a device of this character which is easy to assemble and align, and which requires less space than prior devices.

Figure 1:
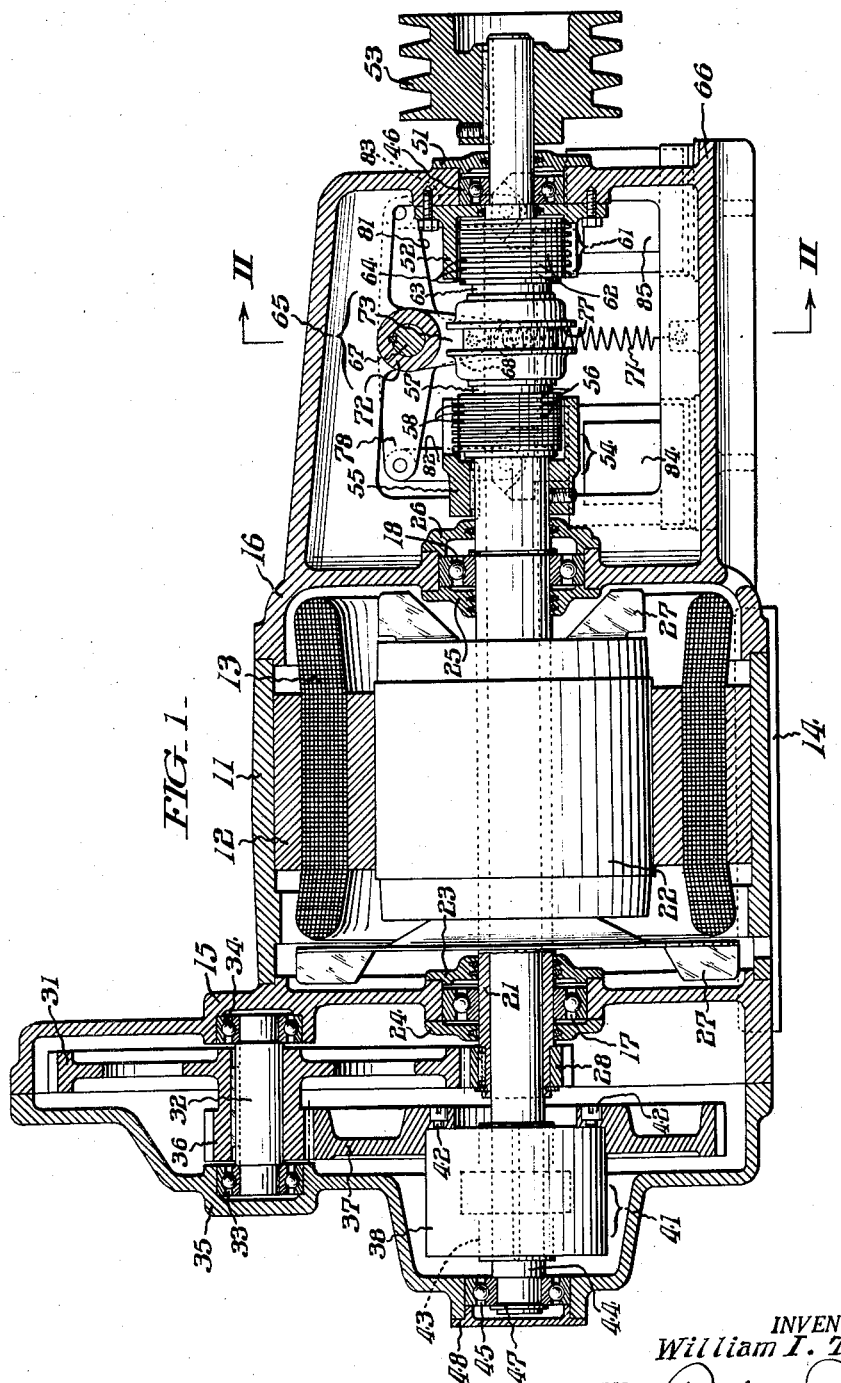
Figure 2:
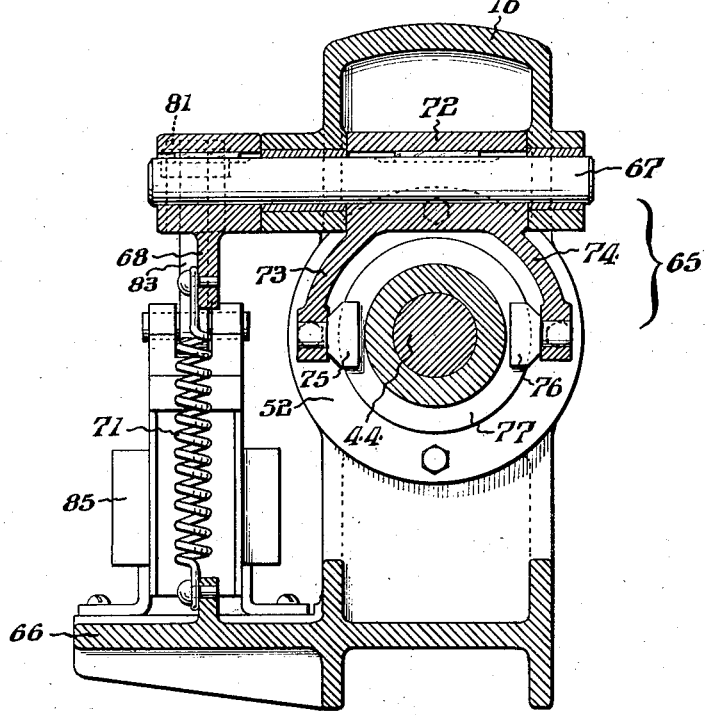

Further objects and advantages of the invention, as well as the details of a typical and preferred embodiment thereof, will be understood from the detailed description to follow, throughout which reference is made to the accompanying drawings wherein:

Fig. 1 is a view in side elevation and partly in section of one specific form of a two speed device embodying features of this invention; and Fig. 2 is a sectional view, on an enlarged scale, of the device taken as indicated by the lines and arrows II—II which appear in Fig. 1.

Although specific terms are used in the following description for clarity, these terms are intended to refer only to the structures shown in the drawings, and are not intended to define or limit the scope of the invention.

Turning now specifically to the drawings, the number 11 designates a housing having a field ring 12 that supports a field winding 13 of a drive unit 14. Fixed to the left end of housing 11 is an end bell 15, and fixed to the right end of housing 11 is a bracketed end bell 16. End bell 15 is provided with an anti-friction bearing 17, and in bell 16 there is mounted anti-friction bearing 18. Bearings 17 and 18 rotatably support a hollow sleeve or tubular shaft 21 of a rotor 22. In end bell 15 the bearing 17 is retained in place by an inner seal cap 23 and an outer seal cap 24. In bracketed end bell 16 the bearing 18 is locked in place by an inner seal cap 25 and outer seal cap 26.

Fans 27 are mounted on the ends of rotor 22 to circulate air over field winding 13 and rotor 22 to provide cooling. At the left end of the hollow sleeve 21, a drive pinion 28 is keyed to the sleeve. Pinion 28 meshes with a cluster gear 31 that is affixed to an idler shaft 32 that is rotatably mounted in idler bearings 33 and 34. Idler bearing 34 is held in place by end bell 15 and the outer idler bearing 33 is held in place by a gear case cover 35.

Pinion 36, of cluster gear 31 is arranged to mesh with a drive gear 37 that is affixed to the outer portion 38 of an over running clutch 41 by cap screws 42. The over running clutch 41 is a conventional type and is equipped with cams or sprags placed between its outer portion 38 and inner portion 43 so that when its outer portion 38 is driving in the desired direction of rotation, it drives the inner portion 43 by means of the cams or sprags. The over running of clutch 41 is accomplished when its inner portion 43 is driven at a higher rate of speed than its outer portion 38 in the same direction of rotation, since then the cams or sprags are released to allow inner portion 43 to over run or free wheel. The inner portion 43 is keyed to a second or drive shaft 44 which is positioned within and concentric with hollow sleeve 21. Drive shaft 44 is supported in bearing 45 mounted in gear acse cover 35 and by bearing 46 within bracketed end bell 16. Lock ring 47 holds bearing 45 in position on drive shaft 44, and its outer race is positioned in the gear case cover 35 and by bearing 46 within bracketed end bell 16, the bearing 46 is held in place by a seal cap 51 and a brake cup 52. The portion of drive shaft 44 that extends beyond seal cap 51 is keyed to a drive sheave 53.

To the right of seal cap 26 (Fig. 1) is positioned a clutch 54, of the well known multiple friction disc type. Clutch 54 includes a clutch cup 55 fixed to sleeve 21 and has a number of friction discs 56 extending transversely to the axis of the sleeve. Mounted on drive or second shaft 44 is a clutch sleeve 57 which is concentric with, rotatable and slidable with respect to second shaft 44. Sleeve 57 has discs 58 mounted thereon which are positioned intermediate the clutch cup discs 56. Discs 56 and 58 are moved into contact with each other to rotate second shaft 44 with tubular shaft 21, and discs 56 and 58 are moved out of contact to permit rotation of second shaft 44 with outer portion 38 of over running clutch 41.

Spaced axially to the right of clutch 54 is a brake 61. Brake 61 comprises the brake cup 52 fixedly secured to end bell 16, which has shaft 44 passing therethrough and is provided with a number of fixed friction discs 62 extending transversely to the axis of drive shaft 44. Mounted on drive shaft 44 is a brake sleeve 63 which is concentric with, rotatable and slidable with respect to drive shaft 44. Sleeve 63 has discs 64 mounted thereon which are positioned intermediate the brake cup discs 62. Discs 62 and 64 are moved into contact with each other to stop rotation of drive shaft 44, and are moved out of contact to permit rotation of drive shaft 44.

A shipper 65 is provided for moving clutch 54 and brake 61 into and out of engagement. Shipper 65 is mounted on end bell 16 and includes a shifting shaft 67 positioned transversely to drive shaft 44 and having at one end an operating lever 68 which is connected to base plate 66 of end bell 16 by a compression spring 71. A forked lever 72 having arms 73, 74 extends downwardly from shifting shaft 67. Rotatably mounted on the ends of arms 73 and 74 are shipper dogs 75, 76 which engage center groove 77 in shipper 65 for moving it laterally in response to the rotation of shifting shaft. Rotation of shifting shaft 67 is accomplished through rocker arms 78 and 81 which are pivotally connected to links 82 and 83 which are in turn, connected to actuating solenoids 84 and 85.

In operation, drive unit 14 is energized and rotor 22 turns to rotate tubular shaft 21 and drive pinion 28. This rotates cluster gear 31 and its pinion 36 which meshes with drive gear 37 on the outer portion 38 of over running clutch 41. Through clutch cams of sprags, the outer portion 38 drives inner portion 43 of clutch 41 and rotates drive shaft 44 and drive sheave 53 at a reduced speed. It will be appreciated that shipper 65 is in its neutral position as shown in Fig. 1, when shaft 44 is rotating at this speed. This speed is suitable, for example, for the wash cycle of a washing machine. While the device is operating at its slow speed, the solenoids 84, 85 are de-energized and shipper 65 is held in its neutral position through the action of spring 71.

When it is desired to rotate shaft 44 at its fast speed, at a speed used for the drying cycle of a washing machine, for example, solenoid 85 is energized manually or by a timing device, thereby moving clutch sleeve 57 laterally to the left along drive shaft 44 and bringing clutch 54 into engagement. With clutch 54 engaged shaft 44 rotates at rotor or high speed and the rotation speed of the inner portion 43 of over running clutch 41 exceeds that of the outer portion 38 causing the clutch 41 to over run or free wheel.

Should the operator want to quickly stop the device after operating at high speed or to hold the work carrier or basket stationary while loading, solenoid 84 is energized, solenoid 85 being de-energized. This brings the discs of brake 61 into engagement to stop rotation of shaft 44.

It is to be understood that the form of the invention herewith shown and described is to be taken as a preferred embodiment. Various changes may be made in the shape, size and arrangement of parts. It will be appreciated that equivalent elements may be substituted for those illustrated and described, that parts may be reversed, and that certain features of the invention may be used independently of the use of other features. For example, a magnetic clutch and brake may be substituted for the multiple disc clutch and brake. Such substitution would eliminate the solenoids, the shifting fork lever, connecting links, neutral centering spring and the shipper dogs. Other substitutions may be made, provided the remaining arrangement and combination of parts is within the spirit and scope of the invention as defined in the appended claims.

Having thus described my invention, I claim:

1. A variable speed device comprising an electric motor having a rotatable hollow shaft, gear means connected to said hollow shaft, over running clutch means connected to said gear means, a second shaft rotatable within said hollow shaft and arranged in operative relationship with said over running clutch means, a second clutch means for connecting the rotatable hollow shaft and the second shaft, brake means for braking said second shaft, and shipper means for actuating said second clutch means and said brake means.

2. A variable speed device comprising a housing, a rotatable hollow shaft journalled in the housing, an electric motor having its rotor operatively connected to the hollow shaft, a second shaft mounted for rotation within said hollow shaft, gear means connected to the hollow shaft, over running clutch means connected between the gear means and the second shaft, brake means connected between the second shaft and the housing, a second clutch means for connecting the hollow shaft and the second shaft, and shipper means for actuating said second clutch means and said brake means.

3. A two speed device comprising a housing; a tubular shaft journalled in said housing; a source of motive power operatively connected with said tubular shaft for rotating said tubular shaft; a drive pinion affixed to one end of said tubular shaft; a cluster gear positioned to mesh with the drive pinion, said cluster gear being fixed to an idler shaft rotatably mounted in said housing, said cluster gear having a pinion end positioned to mesh with a drive gear; an over running clutch having an inner portion and an outer portion, said outer portion being rigidly secured to said drive gear to rotate therewith, said outer portion containing means to rotate said inner portion at the same speed as said outer portion and to permit rotation of said inner portion at a greater speed than said outer portion; a second shaft journalled in said housing, said second shaft being rotatably positioned within said tubular shaft and rigidly affixed to said inner portion to rotate therewith; clutch means mounted at the other end of said tubular shaft, said clutch means having a clutch cup rigidly affixed to said tubular shaft, said clutch cup including a plurality of friction discs extending transversely to the axis of said tubular shaft, a clutch sleeve mounted on said second shaft and being concentric with, rotatable and slidable with respect to said second shaft, said sleeve having disc fixedly mounted thereon and being positioned intermediate said clutch cup discs; shipper means for moving said clutch sleeve discs into contact with said clutch cup discs to rotate said second shaft with said tubular shaft, and for moving said clutch sleeve discs out of contact with said clutch cup discs to permit rotation of said second shaft with said outer portion of said over runnning clutch; brake means operatively connected to said second shaft, said brake means having a brake cup fixedly secured to said housing and surrounding said second shaft, said brake cup including a plurality of friction discs extending transversely to the axis of said second shaft, a brake sleeve mounted on said second shaft and being concentric with, rotatable and slidable with respect to said second shaft, said brake sleeve having discs fixedly mounted thereon and being positioned intermediate said brake cup discs; and said shipper means for moving said brake sleeve discs into contact with said brake cup discs to stop rotation of said second shaft, and for moving said sleeve discs out of contact with said brake cup discs to permit rotation of said second shaft.

References Cited in the file of this patent
UNITED STATES PATENTS

| | | |
|---|---|---|
| 784,285 | Sturtevant | Mar. 7, 1905 |
| 2,176,209 | Clark | Oct. 17, 1939 |

UNITED STATES PATENT OFFICE

CERTIFICATE OF CORRECTION

Patent No. 2,862,588 December 2, 1958

William I. Tebo

It is hereby certified that error appears in the above numbered patent requiring correction and that the said Letters Patent should read as corrected below.

In the grant, lines 2 and 12, and in the heading to the printed specification, lines 3 and 4, name of assignee, for "Detrex Corporation" read -- Detrex Chemical Industries, Inc. --.

Signed and sealed this 17th day of March 1959.

(SEAL)

Attest:

KARL H. AXLINE
Attesting Officer

ROBERT C. WATSON
Commissioner of Patents